United States Patent [19]

Leopold

[11] Patent Number: 5,275,127
[45] Date of Patent: Jan. 4, 1994

[54] CAT TOY

[75] Inventor: Arthur B. Leopold, Secaucus, N.J.

[73] Assignee: Tarel Seven Design, Inc., Paramus, N.J.

[21] Appl. No.: 892,171

[22] Filed: Jun. 2, 1992

[51] Int. Cl.⁵ .............................................. A01K 29/00
[52] U.S. Cl. ...................................... 119/706; 119/711; D30/160
[58] Field of Search ................... 119/29, 29.5, 83; 482/54, 51; 128/57, 56; D30/160, 158

[56] References Cited

U.S. PATENT DOCUMENTS

| | | | |
|---|---|---|---|
| D. 206,579 | 1/1967 | Sherwood | D30/158 |
| D. 237,629 | 11/1975 | Keene | D30/158 |
| 4,611,556 | 9/1986 | Frank | 119/29 |
| 4,907,540 | 3/1990 | Reynolds | 119/83 |

OTHER PUBLICATIONS

"Pure Pedigree", U.S. Purchasing Exchange; Spring 91, Received Apr. 24, 1991.
"Pyramid Power", Animail Pet Care Products received Sep. 9, 1989.

Primary Examiner—John G. Weiss
Attorney, Agent, or Firm—Ohlandt, Greeley & Ruggiero

[57] ABSTRACT

A device for scratching and clawing by a cat comprising a base, a member adapted to rotate to provide play and exercise by the cat, and a pair of end covers for connecting the member to the base to permit rotation of the member and to provide that the ends of the member are protected from damage by the cat and are prevented from harming the cat. The base of the device also includes a holder for receipt of a tray that can contain an aromatic substance, such as catnip.

20 Claims, 6 Drawing Sheets

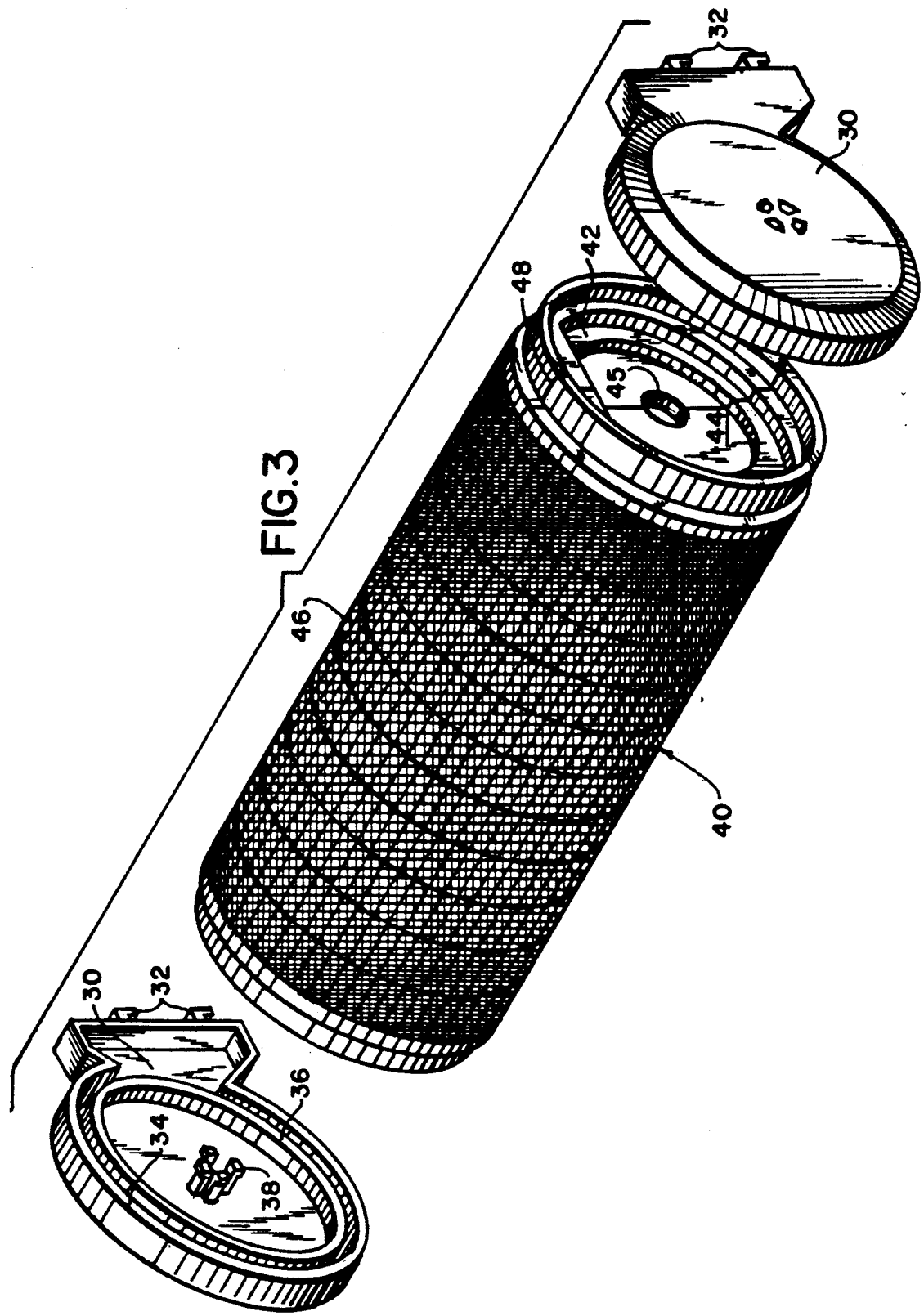

CAT TOY

BACKGROUND OF THE INVENTION

1. Field of the Invention

The present invention relates generally to a toy for an animal and, more particularly, to a cat scratching or clawing toy having a rotating clawing surface for play and exercise by the cat, means for attracting the cat to the scratcher and means for covering the ends of the rotating surface to prevent damage by the cat and harm to the cat. The present toy can readily be fastened to a wall or other structure thereby preventing the toy from leaving a desired location in a residence, such as a home.

Many domestic animals, such as cats, retain their claws since they may be both an indoor and an outdoor animal. Scratching provides a form of exercise for the cat to maintain muscle tone. It is also a daily grooming activity that allows the cat to remove frayed claw fragments and maintain new claws. Cats need to scratch objects that will not injury their paws, while providing a grooming function.

If a scratch post is not provided, the cat will undoubtedly scratch, and thereby damage, other things in home, such as, for example, furniture, drapes, toilet paper and the like.

One problem, heretofore, is to direct the cat to the scratching post and thereby away from furniture in the home. There are several methods to attract the cat. A first method is by using food or an aromatic substance, namely catnip, that will create a desire in the cat to contact the surface or object bearing the substance. A second method is to provide an object with play value. A third method is to provide a desired scratching surface so that the cat can exercise their muscles and groom their claws.

Most scratching posts are fixed posts or other objects made of a fabric-like material that permits the cat to scratch or sink its claws into the post but without damage to its paws. While such scratching posts serve the purpose of grooming the cat's claws and as an exercising activity, it does not provide an amusement for the cat. Also, it does not provide any other incentive for the cat to use the post rather than furniture in the home.

Some scratching posts are rotatable and thus may also provide play value. However, such rotatable scratching posts have, heretofore, failed to provide any protection for the ends of the rotating member so that the cat could possibly be harmed. Further, all rotatable scratching posts have failed to combine an effective aromatic attractant. Still further, such rotatable scratching posts have failed to provide for limiting the movement of the cat scratcher in a desired location.

2. Description of the Prior Art

The use of a fabric type material to coat or cover the surface to be scratched is shown in the prior art. See, for example, U.S. Pat. Nos. 2,894,487, which issued on Jul. 14, 1959 to Goldson, entitled Scratch Post With Renewable Fabric Cover; U.S. Pat. No. 2,997,019, which issued on Aug. 22, 1961 to Bryson, entitled Cat's Claw Filing Post; U.S. Pat. No. 3,604,397, which issued on Sep. 14, 1971 to Salerno, entitled Cat Perch and Exercise Pole; U.S. Pat. No. 4,177,763, which issued on Dec. 11, 1979 to Cook, entitled Cat Scratching Post Assembly and U.S. Design Pat. No. 255,610, which issued on Jun. 24, 1980 to Clarke-Fodor, entitled Self-Grooming Aid For Cats.

U.S. Design Pat. No. 206,579, which issued on Jan. 3, 1967 to Sherwood, et al., entitled Cat Scratching Post and U.S. Design Pat. No. 238,190, which issued on Dec. 23, 1975 to Keene, entitled Combined Animal Oiler and Scratcher appear to illustrate a rotatable scratcher. The scratcher is mounted on a bar that is, in turn, connected to a base. Each design has at least a portion of the rotatable shaft exposed so that the animal could possibly be harmed. Each design appears to be free standing.

U.S. Pat. No. 2,005,817, which issued on Jun. 25, 1935 to Yoder, entitled Scratching Post is directed to a vertically mounted, free standing scratching post that has pockets for receipt of packets of catnip.

U.S. Pat. No. 4,926,796 which issued on May 22, 1990, U.S. Pat. No. 4,807,569, which issued on Feb. 28, 1989 and U.S. Pat. No. 4,747,371, which issued on May 31, 1988, entitled Grooming Device to the applicant of the present invention is directed to a cat grooming device that has a catnip compartment. See also, U.S. Pat. No. 4,907,540, which issued on Mar. 13, 1990 to Reynolds, entitled Apparatus and Method For Removing Cat Hair provides a cat grooming device having a catnip compartment.

A commercial product called the Kitty Korner Klawer is a scratching device having a carpeted surface and a slidable catnip container. This product fails to provide for rotation of the clawing surface.

Thus, the prior art fails to provide a cat clawer or scratcher that can placed in a fixed position and that combines an attractant rotatable member for exercising and clawing, and means, such as catnip, to attract the cat to the cat clawer, along with means to protect the ends of the rotatable member.

SUMMARY OF THE INVENTION

Against the foregoing background, it is a primary object of the present invention to provide a cat clawer or scratcher.

It is another object of the present invention to provide such a cat scratcher having a rotating clawing surface for play and exercise by the cat.

It is still another object of the present invention to provide such a cat scratcher that also provides at least one catnip compartment for containing an aromatic substance.

It is yet another object of the present invention to provide such a cat scratcher that includes a pair of end brackets that act to cover the ends of the rotating surface to prevent harm to the cat and damage by the cat.

To the accomplishments of the foregoing objects and advantages, the present invention, in brief summary, comprises a cat scratcher comprising a base, a member adapted to rotate to provide play and exercise by the cat, means for connecting the member to the base to permit rotation of the member and to provide that the ends of the member are protected to prevent harm to the cat and prevent from damage by the cat, and means for attracting the cat to the scratcher. The member, preferably, has a sisal thereon that permits the cat's claws to exercise without harm to the claws. The connecting means, preferably, is a pair of end brackets that clip into the base and are adapted to fit about the ends of the member to permit rotation of the member, yet prevent access by the cat. The means for attracting the cat to the cat scratcher is a pair of trays held in place on the base by a pair of holders connected to the base. The trays are adapted to contain catnip or another aromatic substance therein.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 3 is an exploded, partial view of the rotatable member and the pair of end brackets of the cat scratcher of FIG. 1;

BRIEF DESCRIPTION OF THE PREFERRED EMBODIMENTS

Figure 1:
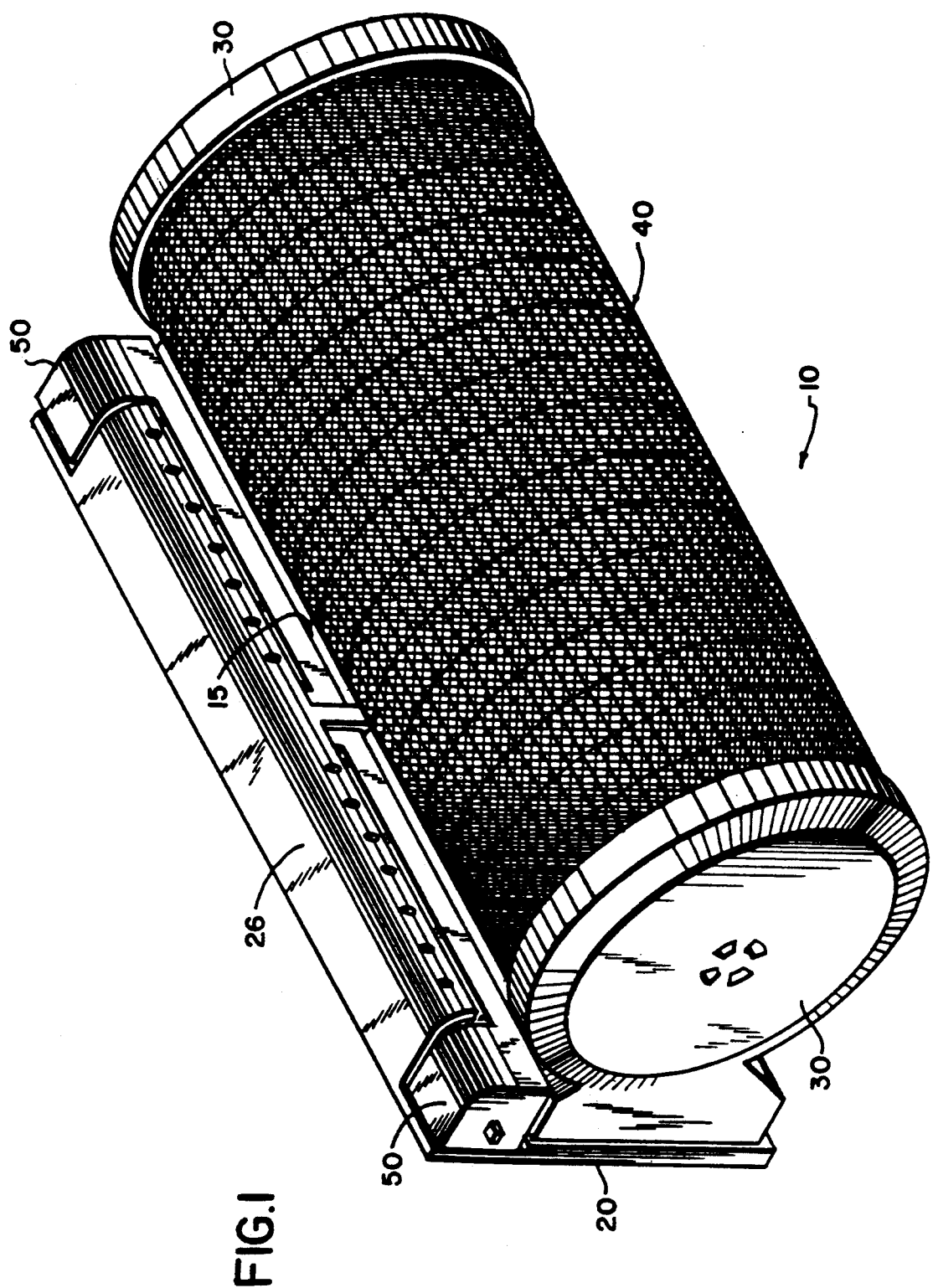
FIG. 1 is a perspective view of the cat scratcher of the present invention.

Referring to the drawings and in particular FIG. 1, there is provided a device, generally represented by reference numeral 10, that permits an animal, such as a cat, to scratch or exercise its claws. The device 10 is a cat scratcher or cat clawer. The cat scratcher 10 includes a base or back 20, a pair of removable end covers or brackets 30, a member 40 that is adapted to rotate, at least one holder integrally connected to the base 15 and at least one slidable tray or reservoir 50 for receipt of an aromatic substance. In the preferred embodiment shown in FIG. 1, the device 10 includes a pair of holders 15 and a pair of slidable reservoirs or trays 50.

Figure 2:
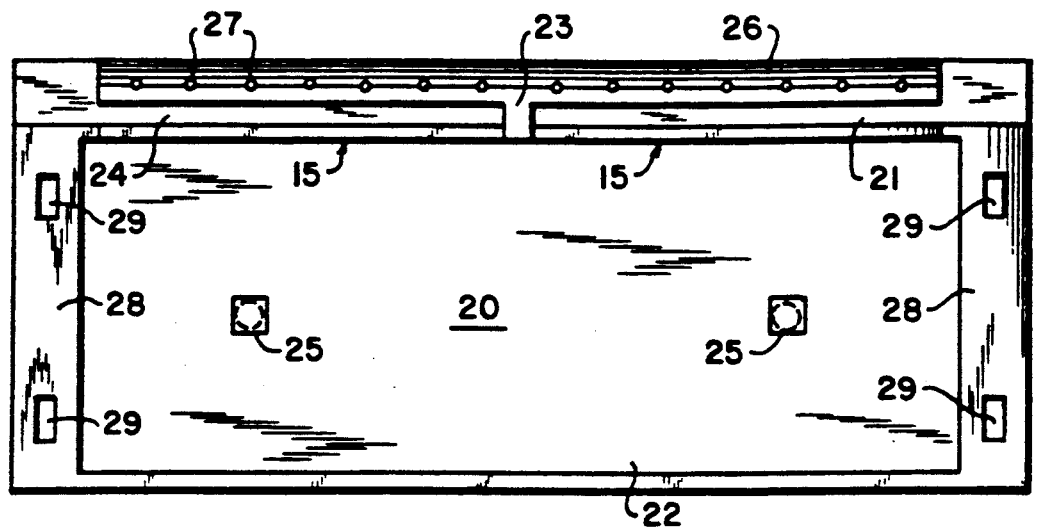
FIG. 2 is a front view of the base of the cat scratcher of FIG. 1.

Referring to FIG. 2, the base 20 has a basically flat portion 22 with a lengthwise member 24 and an arcuate surface 26 shown more clearly in FIG. 1. The base 20 also has a pair of raised end portions 28 each having a pair of apertures 29.

The lengthwise member 24 and surface 26 along with a portion 21 of the base 20, form a pair of holders 15 for receipt of the pair of reservoirs 50. The lengthwise member 24 is basically perpendicular to the portion 21 of the base 20 so that the lengthwise member and the portion 21 along with the arcuate surface 26 provide the three surfaces upon which the reservoir 50 slides. The lengthwise member 24 that is perpendicular to the base 20 also serves as a reinforcement rib. Accordingly, the base 20 is less likely to bend due to the lengthwise member 24.

The arcuate surface 26 has a plurality of apertures 27 therein. These apertures 27 permit the catnip or other aromatic substance in the compartment to emit their aroma.

The holder 15, which again comprises the portion 21, the perpendicular member 24 and the arcuate surface 26, has, preferably, both ends open. In the preferred embodiment, one of the pair of tray 50 slides out of one end, while the other one of the pair of trays slides out of the other end. The slidability of tray 50 permits it to be easily filled with an aromatic substance, such as catnip, that will attract a cat to the device 10. In the preferred embodiment, the base 20 has a partition 23 that separates or defines the two holders 15 and also prevents one of the pair of trays 50 from sliding into the holder for the other of the pair of trays.

In a preferred embodiment shown in FIG. 2, the member 24 and the arcuate surface 26 are, preferably, integrally formed with the base 20. However, the lengthwise member 24 and the arcuate surface 26 along with the portion 21 could be simply fastened to the base 20.

The base 20 has the pair of raised end portions 28 for receipt of the pair of end brackets 30. Each of the pair of end portions 28 preferably includes, as stated above, a pair of apertures or holes 29 that are adapted to receive the ends of an end bracket 30.

Figure 4:
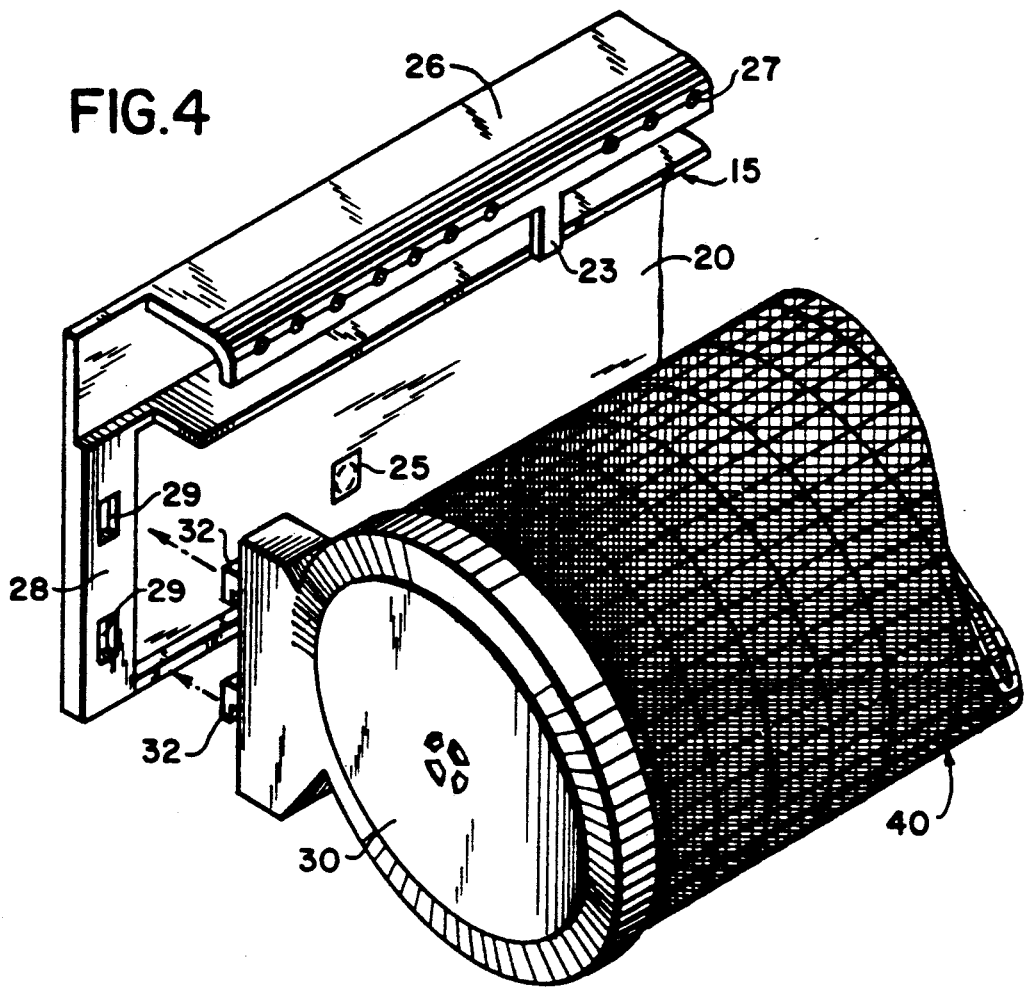
FIG. 4 is an exploded, partial view of an end bracket holding a portion of the rotatable member and the bracket's preferred removable fastening into the base of the cat scratcher of FIG. 1.

Referring to FIGS. 3 and 4, each of the pair of end brackets 30 has a pair of clips 32, shown more clearly in FIG. 4, that are adapted to be received in the apertures 29 of each end portion 28. In the preferred embodiment shown in FIGS. 3 and 4, the clips 32 are L-shaped and the apertures 29 have a rectangular shape. However, the clips 32 and the apertures 29 can have other shapes, and other conventional means can be used to removably attach the end brackets 30 to their respective end portions 28.

The base 20 can be either affixed to a support structure, such as, for example, wall, door or other fixed surface by fastening means or free standing. It is preferred, however, that the base 20 be attached to a support structure so that the scratcher will remain in a desired location.

Figure 5:
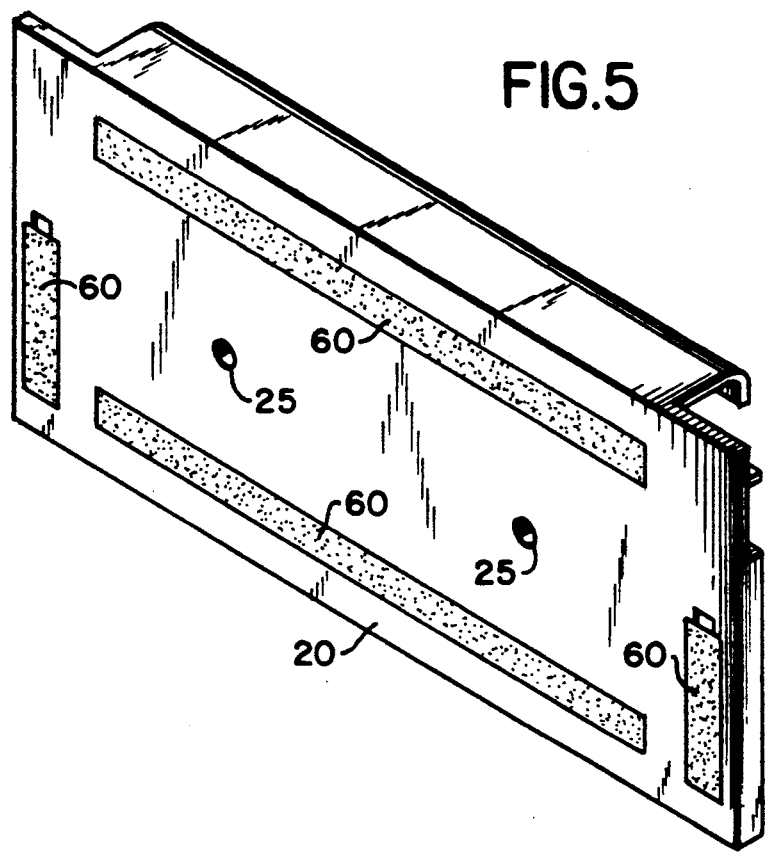
FIG. 5 is a partial rear view of the base of the cat scratcher of FIG. 1.

The fastening means, preferably, is one or more strips of adhesive 60 that fasten or affix to the outside back surface of the base 20 as shown in FIG. 5. In a preferred embodiment, four adhesive strips or fasteners are used and they are placed along the four sides of the outer back surface, three of which are shown in FIG. 5. As shown in FIG. 2, the base 20, preferably, has a pair of holes 25 for receipt of conventional fasteners, such as, for example, screws, bolts or nails, that can be used as an alternative fastening means, to fasten the base and thereby the scratcher to the support structure.

Referring again to FIG. 3, each end bracket 30 has a edge or lip 34 that projects inward toward the rotatable member 40, and has on its inner surface a ridge 36 that also projects inward toward the rotatable member and a plurality of protruding tabs or clips 38. The lip 34 has a larger radial or inward projection than ridge 36. The lip 34 is adapted to fit about or cover the non-fabric type material or bare end 48 of the rotatable member 40 and just over the tip or edge of the fabric type material, while the ridge 36 is adapted to fit about or cover most of the bare end. The ridge 36, however, acts as a rotating guide to prevent the horizontal movement of the core 42 of the rotatable member 40. The plurality of clips 38 hold the rotatable member 40 on the end bracket 30 and permit the friction free rotation of the bare end 48 of the rotate member, while ridge 36 acts as a guide to prevent the horizontal or sliding movement from end bracket to end bracket of the core 42 of the rotatable member. By this structure, an animal, such as a cat, can readily rotate the rotatable member 40. Other means, however, can be used to removably connect the rotatable member 40 to each of the pair of end brackets 30.

In the preferred embodiment, the rotatable member 40 includes a base or core 42 having a fabric type material 46 about its outer surface except for the bare portion or non-fabric type material portion 48 towards each end as shown in FIG. 3. In other words, the bare portion 48 is a portion of the cylinder 42 that is not covered by the fabric type material 46. The radially projecting lip 34 covers the bare portion 48 of the cylinder 42 and a tip end of the fabric type material and is spaced from the outer surface of the rotatable member 40 so as to avoid interfering with the rotation of the rotatable member, yet prevents an animal's paw from getting captured therein.

In the preferred embodiment shown in the figures, the core 42, preferably, is a cylinder. It can, however, have any desired shape provided it is permitted to rotate. For example, such shapes can be a square, rectangle, hexagon or octagon, or the cross-section of the rotatable member can be a square, rectangle, hexagon or octagon.

In the preferred embodiment shown in the figures, the lip 34 and the ridge 36 have a circumferential or circular configuration that complements the cylindrical shape of the rotatable member 40. However, the configurations of the lip 34 and the ridge 36 can take on other shapes that may or may not complement the shape of the rotatable member 40.

By this method of securing the rotatable member 40 to the base 20, the rotatable member, when in place, has the exposed portion of the core 42 covered by the fabric type material 46 so that the cat cannot be inadvertently harmed by the surface of core 42 itself. Also, this method of securing the core 42 to the base 20 prevents an open space to be formed between the rotatable member 40 and the removable end brackets 30 that could cause harm to the cat. In addition, the perpendicular member 24 just misses contacting the rotatable member 40 so that a cat cannot get its paws or claws caught therebetween. These features assure that the cat's paw cannot get caught therebetween and, thus, the cat cannot get harmed.

Figure 6:
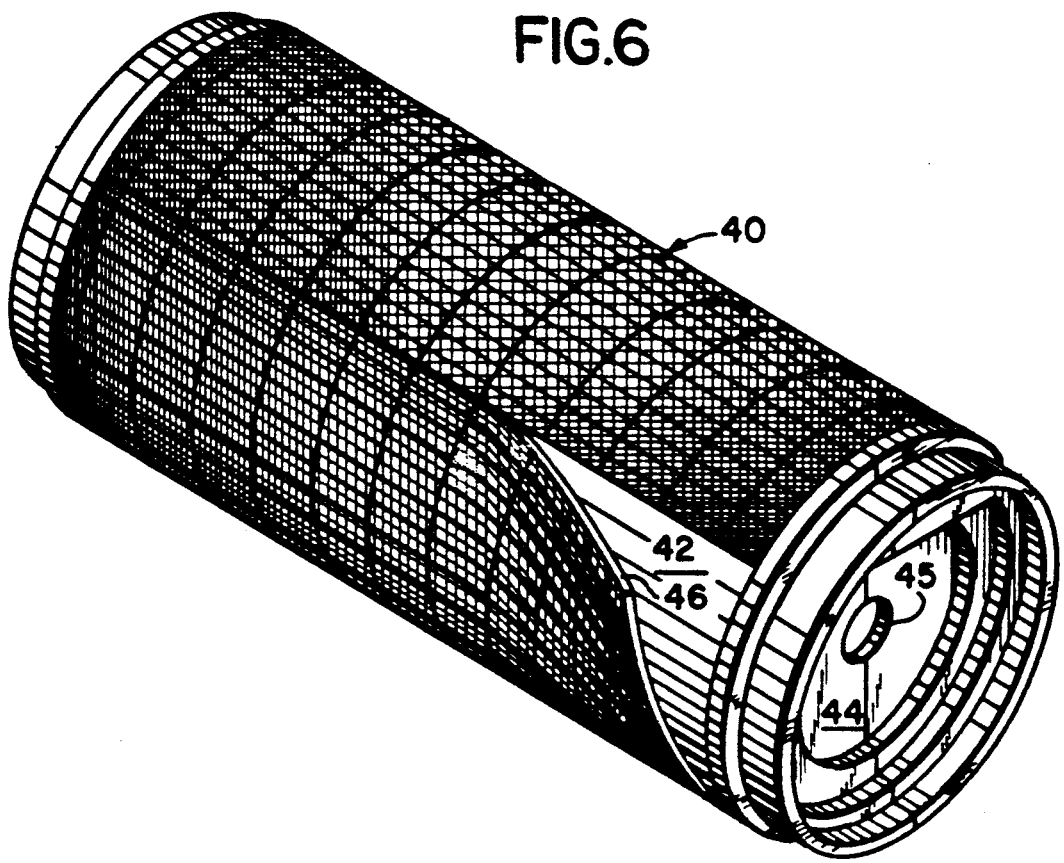
FIG. 6 is a perspective view of the rotatable member of the cat scratcher of FIG. 1

Referring to FIG. 6, the rotatable member 40 is preferably a core 42 having a layer of fabric type material 46 thereon. In the most preferred embodiment, the fabric type material 46 is sisal, however other materials that permit the animal to exercise its paws and manicure its claws can be used.

Referring to FIG. 3, the core 42 has a pair of end surfaces 44 (only one of which is clearly shown in this figure) each with an aperture 45 preferably in the center thereof. Each aperture is adapted to receive the plurality of clips 38 of its respective end bracket 3 to fasten the rotatable member 40 to the end bracket 30.

In the most preferred embodiment for the end bracket 30 shown in FIG. 3, each end bracket has four equally spaced apart clips 38 that are biased outward into the aperture 45 of the end bracket and are pressed inward to permit for the removal of the bracket from the rotatable member 40. It is possible to employ just two equally spaced apart clips or tabs in each one of the pair of end brackets 30 to hold and permit rotation of the rotatable member 40. However, to virtually assure a balanced rotation of core 42, three or more clips in each one of the pair of end brackets 30 should be used.

Figure 7:
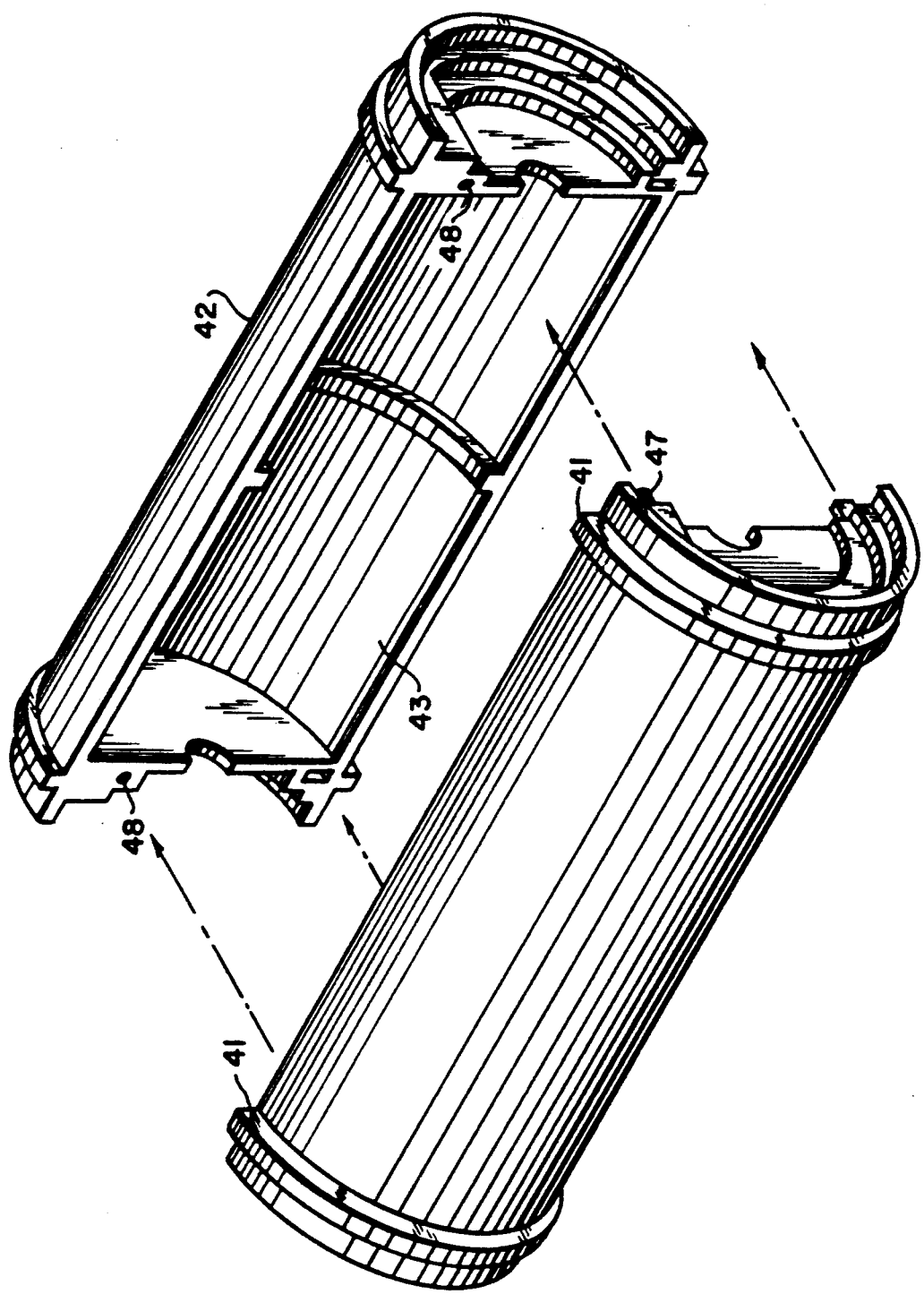
FIG. 7 is a perspective view of the core of the rotatable member of the cat scratcher of FIG. 1.

As shown in FIG. 7, the core 42, preferably, is one piece that initially has a lengthwise opening 43 that can, preferably, be closed by the engagement of male members 47 into female members 48. The fabric type material, preferably, sisal, is secured to core 42 when the core is closed by gluing one end of the fabric type material onto the end of the material. Other conventional means to connect together the ends of the fabric type material can be used, such as, for example, adhesive. For assembly, the fabric type material 46 is placed tautly about core 42.

In an alternative embodiment, not shown, the rotatable member 40 can be a single piece structure. For example, the rotatable member 40 can be made entirely of a relatively rigid fabric type material.

In the preferred embodiment, the fabric type material 46 can slide on the outer surface of the cylindrical core 42. To prevent this sliding, there is provided a pair of circumferential stops 41. Thus, the present device includes, in its most preferred embodiment, a rotatable member 40 that includes a cylindrical core 42 and a sisal 46 thereon. The ridges 36 of the pair of end brackets 30 act to prevent the axial sliding movement, i.e. movement from bracket to bracket, of the core 42 of the rotatable member 40, while the circumferential stops 41 act to prevent axial sliding of the sisal 46 on the outer surface of the cylindrical core.

Figure 8:
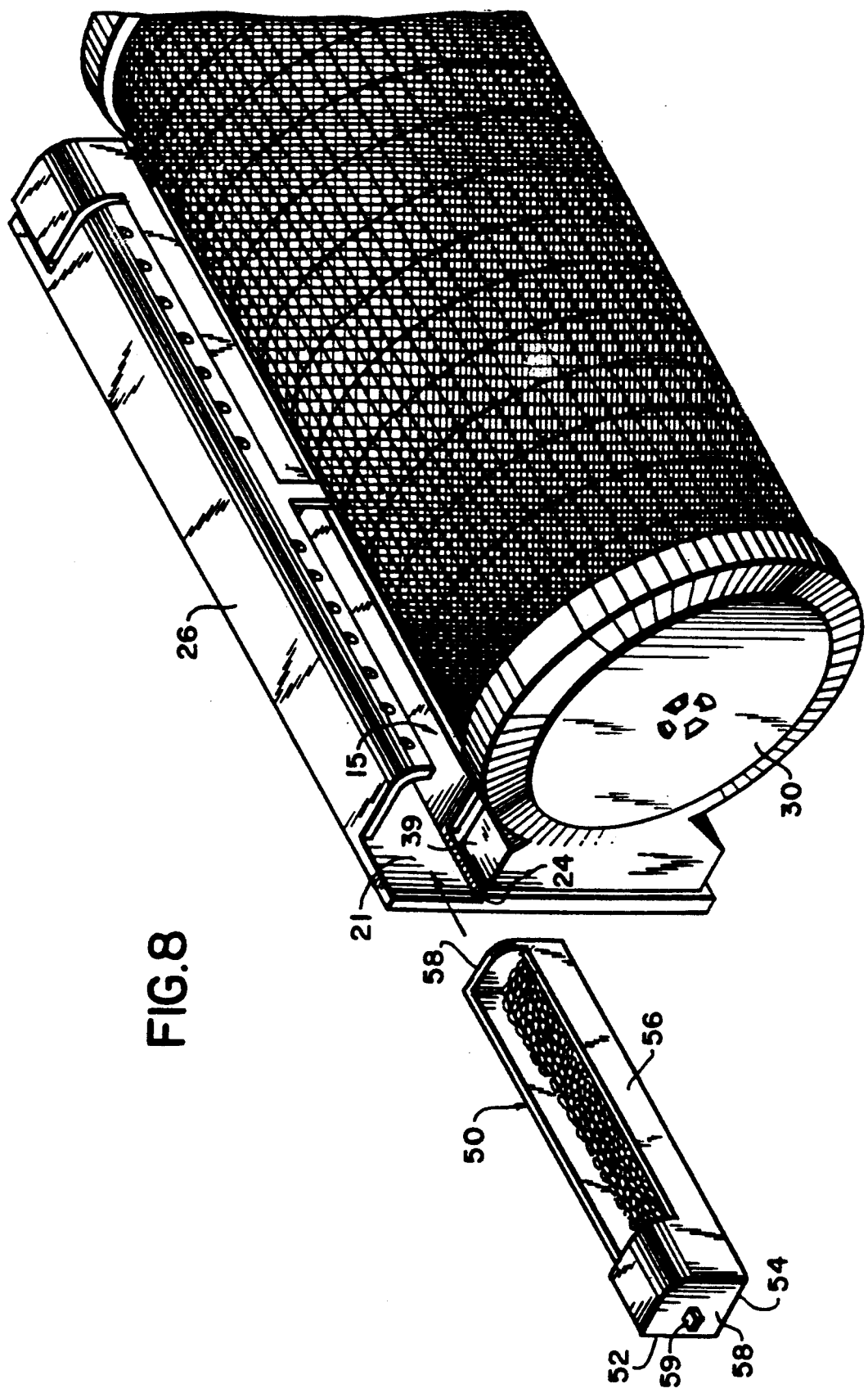
FIG. 8 is an exploded view of the catnip compartment including the reservoir and its holder in the base of the cat scratcher of FIG. 1.

As shown in FIG. 8, tray 50 includes a pair of surfaces 52, 54 that are perpendicular to each other. In the embodiment shown in FIG. 8, surface 52 is a back surface of the tray 50, while surface 56 is the bottom surface of the tray. Tray 50 also includes a low surface or lip 56 and a pair of ends 58. The cross section of tray 50 is almost square except for the large radii corner. This radii corner shape mates with the shape of the compartment formed by the arcuate surface 26 of the holder 15. Also, the surfaces 52, 54 of the tray 50 complement the portion 21 and member 24, respectively, of the base. The tray 50 is sized to mate with the holder but to be just slightly small or with sufficient space in order to permit the tray to slide within the holder. Each tray 50, preferably, includes a tab 59 to permit for the ready removal or insertion of the tray into the holder 15.

Each end bracket 30 has a tab 39. Tab 39 is sized to just contact the tray 50 when the tray is inserted into the holder 15 and the scratcher is in its assembled state. The friction contact of the tab 39 with the tray 50 in particular bottom surface 54, assures that the tray 50 will not simply drop from the holder 15 when jarred by the animal.

Having thus described the invention with particular references to the preferred forms thereof, it will be obvious that various changes and modifications may be made therein without departing from the spirit and scope of the invention as defined by the appended claims.

Wherefore, I claim:

1. A device for clawing and scratching by a cat comprising:

a base having a holder, and having at least two apertures;

a member having a fabric type material thereon, and being adapted to rotate to provide play and exercise by the cat;

a pair of end brackets for connecting the member to the base to permit rotation of the member and to protect the ends of the member from harming the cat, each of the pair of end brackets having a clip, wherein each of the pair of end brackets is removably attached to the base to provide for disassembly of the device by a customer for cleaning of the device; and means for removably attaching each of the pair of end brackets to the base includes the clip of each end bracket and the at least two apertures in the base;

means including the holder for holding an aromatic substance to attract the cat to the device.

2. The device according to claim 1, wherein the base includes a pair of raised end portions each with a pair of apertures.

3. The device according to claim 1, wherein the holder includes an arcuate surface, a member substantially perpendicular to the base and a portion of the base.

4. The device according to claim 1, wherein the member includes a core and a piece of fabric type material on the core.

5. The device according to claim 4, wherein the core is a cylinder, and wherein the fabric type material is sisal.

6. The device according to claim 1, wherein the member is a piece of fabric material that can be assembled into a cylinder.

7. The device according to claim 1, wherein the connecting means includes a pair of end brackets that are removably attached to the base and the member.

8. The device according to claim 7, wherein each of the pair of end brackets has a pair of clips.

9. The device according to claim 8, wherein the base includes a pair of raised end portions, and wherein each of the pair of end portions includes a pair of apertures that are adapted to receive the pair of clips from one of the pair of end brackets.

10. The device according to claim 1, wherein the member has a pair of closed end surfaces with each end surface having an aperture therein.

11. The device according to claim 10, wherein the connecting means includes a pair of end brackets each with a plurality of clips that are adapted to be removably inserted into the aperture of one of the closed ends of the member.

12. The device according to claim 1, wherein the holding means includes a tray.

13. The device according to claim 2, wherein the holding means includes a pair of trays and the holder includes a pair of holders each for receipt of a different one of the pair of trays.

14. The device according to claim 1, further including means for fastening the device to a surface.

15. The device according to claim 4, wherein the fabric type material is sisal.

16. A device for clawing and scratching by a cat comprising:
a base having a holder;
a member adapted to rotate to provide play and exercise by the cat;
means for connecting the member to the base to permit rotation of the member and to protect the ends of the member from harming the cat, wherein the connecting means includes a pair of end brackets that are removably attached to the base and the member, wherein each of the pair of end brackets has a lip and an inner ridge; and
means including the holder for holding an aromatic substance to attract the cat to the device.

17. The device according to claim 16, wherein the member includes a cylindrical core and a piece of fabric type material on the core, and wherein the inner ridge prevents sliding of the core.

18. A device for clawing and scratching by a cat comprising:
a base having a holder, and having two pairs of apertures;
a cylinder having a fabric type material thereon, the cylinder being adapted to rotate to provide grooming, play and exercise by the cat;
a pair of end brackets each being removably attached to the base and the cylinder to provide for disassembly of the device by a customer for cleaning of the device, wherein each of the pair of end brackets permits rotation of the cylinder and has means to protect the ends of the cylinder from harming the cat and prevent damage to the ends by the cat, each of the pair of end brackets having a pair of clips; and
means for removably attaching each of the pair of end brackets to the base includes the pair of clips of each end bracket and the two pairs of apertures in the base, whereby the attaching means are not visible when the device is in its operative position, and are readily accessible for disassembly for cleaning of the device;
means including the holder for holding an aromatic substance to attract the cat to the device.

19. The device of claim 18, wherein each of the pair of end brackets has a plurality of clips, and wherein the cylinder has a pair of closed end surfaces each with an aperture therein for receipt of the plurality of clips of one of the end brackets when the cylinder is secured for rotation onto the end bracket.

20. A device for scratching and clawing by a cat comprising:
a base having pair of end portions, the base also having an arcuate surface and a member substantially perpendicular to the base, wherein the arcuate surface and the member and a portion of the base form a holder, and wherein the base includes a portion that separates the holder into a pair of holders;
a cylinder having a main body portion and a pair of ends, the cylinder having a fabric type material about the outer surface of the main body portion, wherein the cylinder is adapted to rotate to provide play and exercise by the cat;
a pair of end brackets that are removably attachable to the pair of end portions of the base and the pair of ends of the cylinder, each one of the pair of end portions has a raised outer lip and a raised interior ridge that form a channel for receipt of one of the pair of ends of the cylinder, wherein the pair of end brackets permit rotation of the cylinder and protect the pair of ends of the cylinder from harming the cat and prevent the pair of ends from being damaged by the cat; and
a pair of trays each adapted to slide in one of the pair of holders for holding an aromatic substance to attract the cat to the device.

* * * * *